United States Patent
Park et al.

(10) Patent No.: US 7,411,795 B2
(45) Date of Patent: Aug. 12, 2008

(54) DESKTOP HOLDER FOR PORTABLE TERMINAL

(75) Inventors: In-Gon Park, Seoul (KR); Chang-Soo Lee, Incheon (KR)

(73) Assignee: Samsung Electronics Co., Ltd (KR)

( * ) Notice: Subject to any disclaimer, the term of this patent is extended or adjusted under 35 U.S.C. 154(b) by 475 days.

(21) Appl. No.: 11/128,871

(22) Filed: May 12, 2005

(65) Prior Publication Data

US 2006/0007665 A1    Jan. 12, 2006

(30) Foreign Application Priority Data

Jul. 8, 2004    (KR) .................... 10-2004-0052996

(51) Int. Cl.
*H05K 7/02* (2006.01)

(52) U.S. Cl. .................. 361/807; 361/808; 361/801; 361/802

(58) Field of Classification Search ........... 361/807, 361/808; 455/550, 90, 557, 347, 90.1, 90.2, 455/550.1, 555

See application file for complete search history.

(56) References Cited

U.S. PATENT DOCUMENTS

| | | | | |
|---|---|---|---|---|
| 6,138,041 A * | 10/2000 | Yahia | ..................... | 455/569.2 |
| 6,341,218 B1 * | 1/2002 | Poplawsky et al. | ........ | 455/569.1 |
| 6,660,427 B1 * | 12/2003 | Hukill et al. | .................. | 429/97 |
| 6,785,567 B2 * | 8/2004 | Kato | ...................... | 455/575.9 |
| 2003/0148740 A1 * | 8/2003 | Yau et al. | ...................... | 455/90 |
| 2004/0023633 A1 * | 2/2004 | Gordon | ..................... | 455/345 |
| 2005/0215285 A1 * | 9/2005 | Lin | ............................ | 455/557 |

FOREIGN PATENT DOCUMENTS

| | | | |
|---|---|---|---|
| JP | 2000165497 | | 6/2000 |
| JP | 2001017305 | * | 1/2001 |

\* cited by examiner

*Primary Examiner*—Tuan Dinh
*Assistant Examiner*—Hoa C Nguyen
(74) *Attorney, Agent, or Firm*—The Farrell Law Firm, PC

(57) ABSTRACT

Provided is a desktop holder for a portable terminal. The desktop holder for a portable terminal includes a main body and a soft member. The soft member is elastically assembled with the main body, has an opening corresponding to a shape of any portable terminal selected out of various kinds of portable terminals, and holds a selected portable terminal on the main body.

11 Claims, 4 Drawing Sheets

DESKTOP HOLDER FOR PORTABLE TERMINAL

PRIORITY

This application claims priority under 35 U.S.C. § 119 to an application entitled "Desktop Holder for Portable Terminal" filed in the Korean Intellectual Property Office on Jul. 8, 2004 and assigned Serial No. 2004-52996, the contents of which are incorporated herein by reference.

BACKGROUND OF THE INVENTION

1. Field of the Invention

The present invention generally relates to a portable terminal, and more particularly, to a desktop holder for a portable terminal.

2. Description of the Related Art

Generally, portable terminals are devices providing a wireless communication function between a user and another user or a user and a mobile communication service provider through a base station, and a user can use services such as voice communication, short message transmission/reception, multimedia, and mobile banking while carrying the portable terminal.

Portable terminals are classified into bar type, flip type, and folder type portable terminals, and recently, sliding type, swing type, and rotary type portable terminals have been put on the market, satisfying users' various tastes. Those skilled in the art will easily understand the portable terminals.

A portable terminal includes a battery pack supplying electric power for performing wireless communications and functions stored in the portable terminal. A user can use the portable terminal during the available time of electric power charged in the battery pack of the portable terminal. Therefore, the portable terminal further includes a charger for recharging the battery pack.

Generally, the charger for the portable terminal has a structure in which a charging circuit is installed in a portable terminal holder, and the portable terminal holder includes a holding groove for holding the portable terminal. Since a holding groove of a portable terminal holder corresponds to a unique shape of the corresponding terminal, a specific portable terminal holder can charge only a single type of terminals.

Accordingly, specific chargers should be prepared for the different types of portable terminals. Since the user must buy a new charger together with a new portable terminal when an old portable terminal is replaced, the use pays additional expenses. Since manufacturers always supply chargers with portable terminals, manufacturing costs also increase.

Therefore, manufacturers have tried to reduce manufacturing costs and additional user expenses by providing universal chargers in common to many terminals. As the result, manufacturers make charging circuits used in common by installing each charging circuit in each separate adapter, separately manufacture desktop holders for holding portable terminals, and supply only the separate desktop holders to users in need.

However, even if the manufacturers have tried to provide universal chargers for portable terminals, there still exists the problem that desktop holders for portable terminals must be manufactured for every individual terminal. Even if charging circuits do not have to be built in every holder, costs required to manufacture holders and additional user expenses caused thereby cannot be greatly reduced.

SUMMARY OF THE INVENTION

An object of the present invention is to substantially solve at least the above problems and/or disadvantages and to provide at least the advantages below. Accordingly, an object of the present invention is to provide a desktop holder for a portable terminal, with which costs required to manufacture accessories, such as a charger for the portable terminal, and thus, additional user expenses can be saved.

According to one aspect of the present invention, a desktop holder for a portable terminal includes a main body and a soft member being elastically assembled with the main body. The soft member has an opening corresponding to a shape of any portable terminal selected out of various kinds of portable terminals, and holds the selected portable terminal on the main body.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
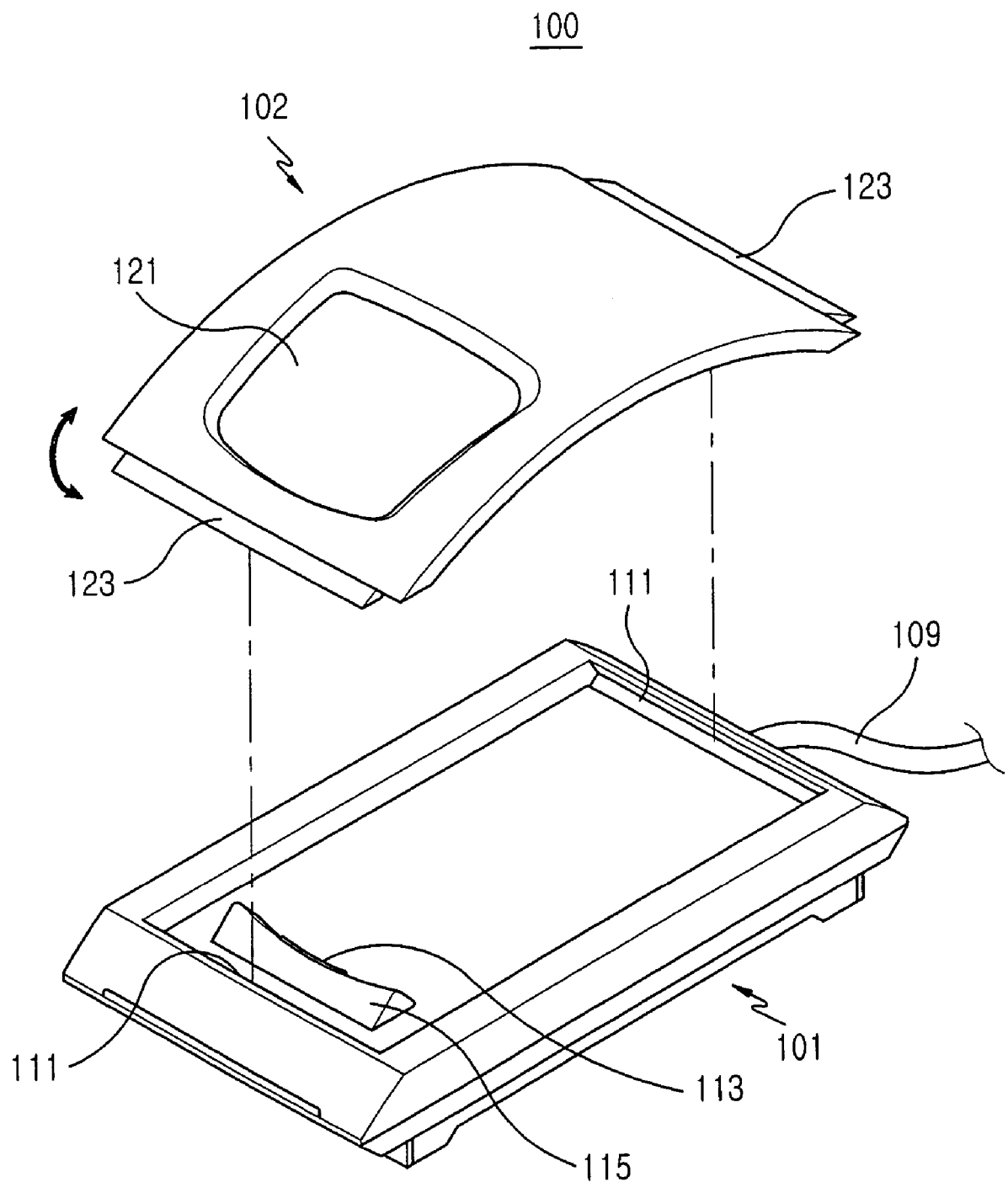
FIG. 1 is a disassembled perspective view of a desktop holder for a portable terminal according to a preferred embodiment of the present invention.

A preferred embodiment of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

As shown in FIGS. 1 through 4, a desktop holder 100 for a portable terminal 10 according to a preferred embodiment of the present invention includes a main body 101 and a soft member, or a flexible member, (such as, a supporting plate) 102, which is assembled with the main body 101 elastically.

Figure 4:
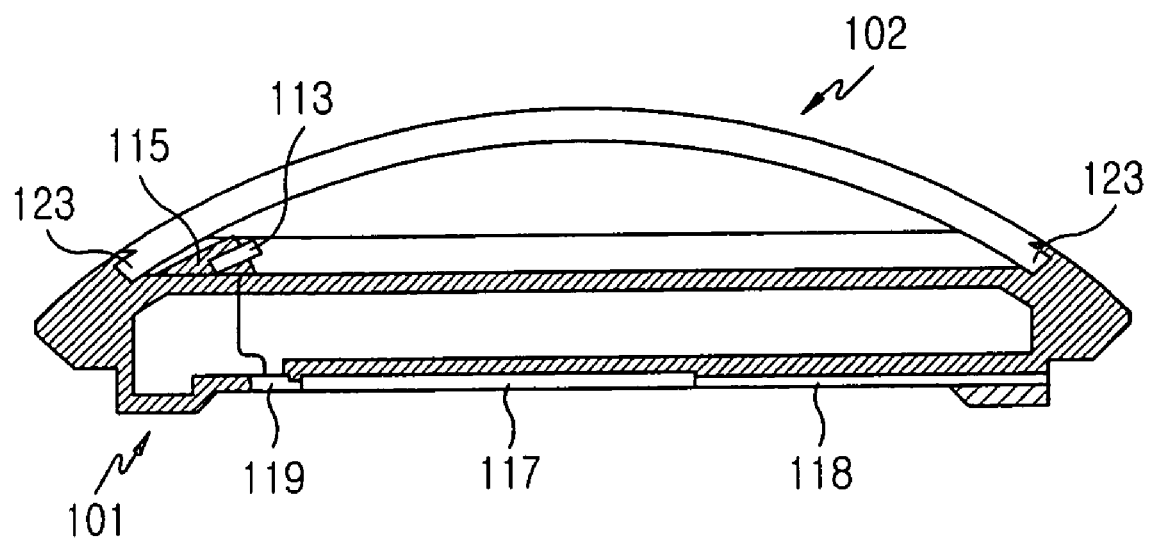
FIG. 4 is a side-sectional view of the desktop holder shown in FIG. 2.

Slots 111 are included in both ends of the top surface of the main body 101. The slots 111 facing each other are parallel extended, and as shown in FIG. 4, slopes of the slots 111 are formed so as to be gradually far from each other in a direction from the top surface to the bottom surface of the main body 101. Both ends of the supporting plate 102 are inserted in the slots 111, and the supporting plate 102 is elastically supported by the slots 111.

Figure 2:
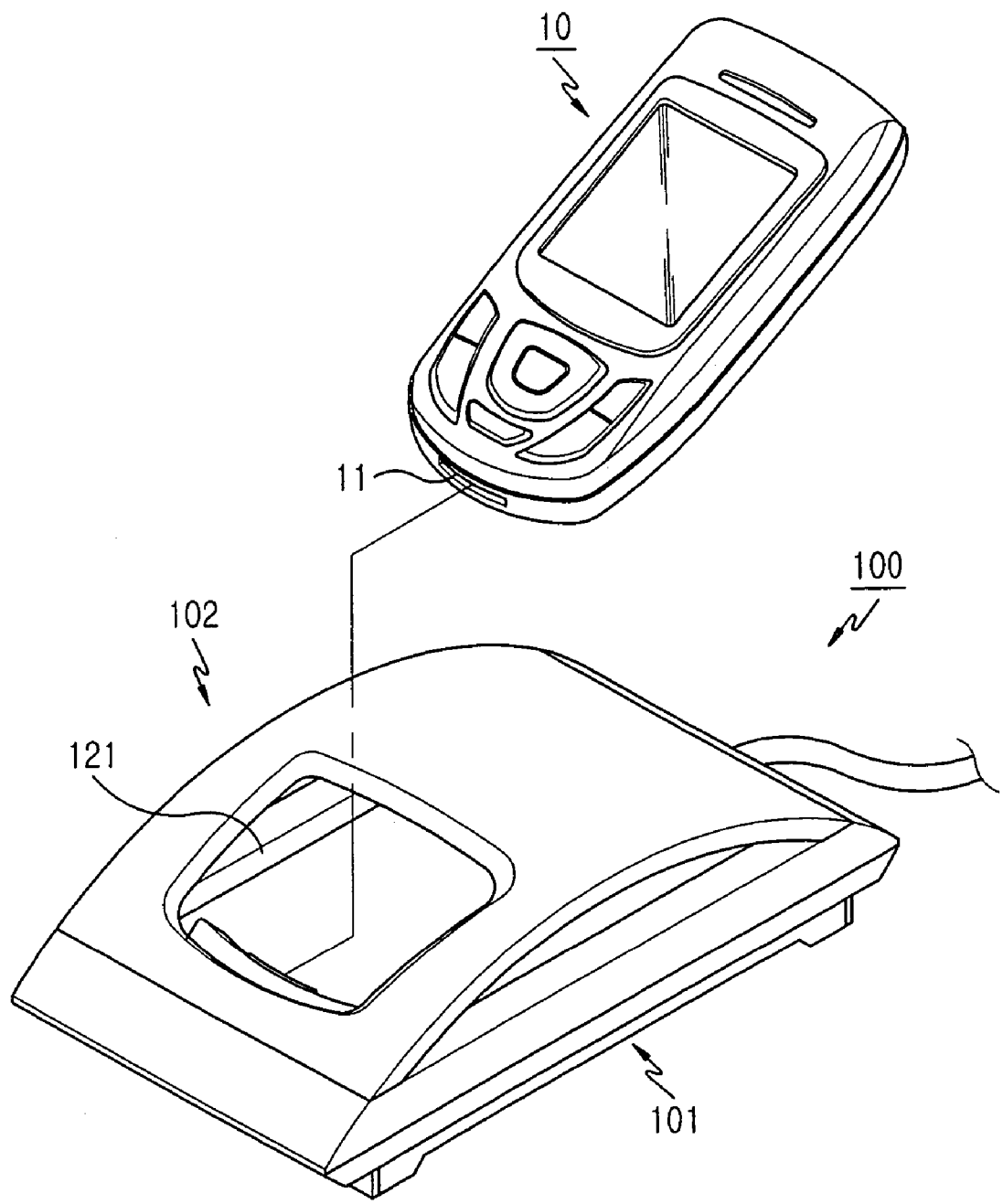
FIG. 2 is an assembled perspective view of the desktop holder shown in FIG. 1.

Referring to FIG. 2, a supporter 115 and an interface connector 113 are assembled with the top surface of the main body 101. The supporter 115 is located near one of the slots 111 and supports the bottom end of the portable terminal 10 held on the desktop holder 100. The interface connector 113 is assembled with the supporter 115 and connected to a connector hole 11 of the portable terminal 10. The connector hole 11 of the portable terminal 10 is electrically connected with external devices such as a personal computer (PC) or a portable charger (not shown). The connector hole 11 is formed in the bottom end of the portable terminal 10. When the portable terminal 10 is held on the desktop holder 100, the interface connector 113 is connected to the connector hole 11.

Figure 3:
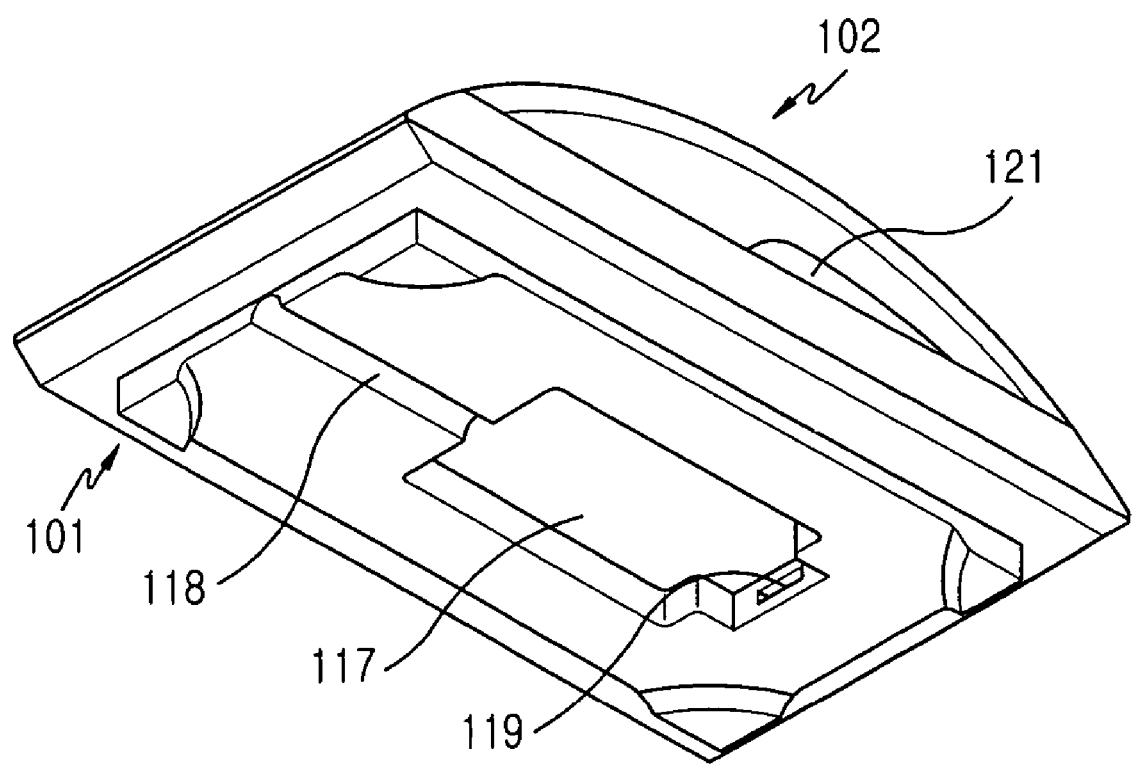
FIG. 3 is a bottom perspective view of the desktop holder shown in FIG. 2.

Referring to FIG. 3, a containing recess 117 and a guiding recess 118 are formed on the bottom surface of the main body 101. The containing recess 117 and the guiding recess 118 are connected with a connector of an external device, such as a separately manufactured portable charger or a PC. The containing recess 117 is formed so as to be sunk into the bottom surface of the main body 101, and the connector of the external device is placed on the containing recess 117. A connecting terminal 119, which is assembled with the main body 101 and connected with the interface connector 113, is exposed on one side wall of the containing recess 117. The guiding recess 118 extends from the other side wall of the containing recess 117 to the outer surface of the main body 101. When the connector of the external device is connected to the connecting terminal 119, a cable 109 of the connector of the external device is fixed onto the guiding recess 118. Therefore, even if the connector of the external device is connected to the connecting terminal 119 assembled with the main body 101, the connector and cable 109 of the external device are not exposed out from the outer surface of the main body 101.

The supporting plate 102 is a soft member having elastic properties such as urethane and has a flat board shape. Both ends 123 of the supporting plate 102 are supported by the slots 111 of the main body 101. The supporting plate 102 is produced longer than the main body 101. When the both ends 123 of the supporting plate 102 are inserted into the slots 111, a center portion of the supporting plate 102 is curved and located over the main body 101. Since the supporting plate 102 is made of a soft member having elasticity, a user can assemble or disassemble the supporting plate 102 with or from the main body 101 and also replace the supporting plate 102 if necessary. The supporting plate 102 includes an opening 121 for passing through the top surface and the bottom surface of the supporting plate 102. The opening 121 is located at one side of the center portion of the supporting plate 102. The opening 121 has a shape corresponding to a predetermined shape of any portable terminal selected out of various kinds of portable terminals.

When the supporting plate 102 is assembled with the main body 101, the supporter 115 and the interface connector 113 are placed near one end portion of the opening 121. The portable terminal 10 is held on the holder 100 through the opening 121, and a surrounding edge of the opening 121 supports an outer surface of the portable terminal 10. The portable terminal 10 held on the holder 100 is supported by the surrounding edge of the opening 121, the bottom end of the portable terminal 10 is supported by the supporter 115, and the connector hole 11 of the portable terminal 10 is connected to the interface connector 113. Accordingly, the portable terminal 10 can be stably maintained.

Since a shape of a containing recess in a conventional desktop holder is configured to correspond to a shape of a specific portable terminal in order to hold the portable terminal, it is difficult to hold other kinds of portable terminals. Therefore, since it is difficult to use a holder in common, holders must be separately manufactured and supplied for different type of portable terminal, and users have to buy the holders along with the portable terminals.

Therefore, a structure for supporting portable terminals must be configured to use holders in common when the portable terminals are held on the holders.

According to a configuration of the desktop holder 100, the main body 101 includes the interface connector 113 for electrically connecting a portable terminal and an external device and includes the supporter 115 for supporting the bottom end of the portable terminal held on the desktop holder 100. The supporting plate 102 includes the opening 121 for supporting the outer surface of the portable terminal. The supporter 115 supports the portable terminal for contacting the bottom end of the portable terminal, and the portable terminal held on the desktop holder 100 is supported by the opening 121. The supporting plate 102 is also disassembled from the main body 101. Therefore, the desktop holder 100 for a portable terminal can use the main body 101 in common regardless of different kinds of portable terminals. Therefore, it is enough to supply only the supporting plate 102 in which a shape of the opening 121 differs according to the kinds of portable terminals.

Since the supporting plate 102 is also made of elastic materials, a user can easily assemble and disassemble the supporting plate 102 with or from the main body 101 and replace the supporting plate 102 in which the opening 121 having a unique shape according to a kind of portable terminal is formed.

Accordingly, the user can use a main body of the desktop holder in common along with a portable charger regardless of the type of portable terminals and only a supporting plate suitable for the portable terminal together with the portable terminal can be supplied. Accordingly, when a user wishes to replace an old portable terminal with a new one, the user can reduce expenses for additionally buying the portable charger or desktop holder along with a new portable terminal. Moreover, since the supporting plate is made of a soft member having elasticity, the supporting plate can be packed in a flat board shape when the supporting plate is shipped with the portable terminal. Accordingly, the package is slimmer than when an entire desktop holder is packed, thereby contributing to a reduction in packing costs.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A desktop holder for a portable terminal, comprising:
   a main body;
   a soft member being elastically assembled with the main body, the soft member having an opening corresponding to a plurality of shapes of portable terminals, the soft member holding the portable terminal on the main body; and
   a pair of slots, which are formed on both ends of a top surface of the main body to face each other,
   wherein both ends of the soft member are restrained by the pair of slots so that a center portion of the soft member is curved upward.

2. The desktop holder of claim 1, wherein the soft member is replaceable.

3. The desktop holder of claim 1, wherein the soft member is plate-shaped.

4. The desktop holder of claim 1, wherein the opening is located at one side of the center portion of the soft member.

5. The desktop holder of claim 1, further comprising an interface connector being assembled to one side of a top surface of the main body in the vicinity of the opening, wherein the portable terminal supported by the opening is connected to the interface connector.

6. The desktop holder of claim 5, further comprising a supporter being formed on one side of the top surface of the main body in the vicinity of the opening, and contacting a bottom end of the portable terminal supported in the opening.

7. The desktop holder of claim 6, wherein the interface connector is assembled with the supporter formed near the opening.

8. The desktop holder of claim 5, wherein the interface connector is assembled with the supporter formed near the opening.

9. The desktop holder of claim 1, further comprising:
   a containing recess being sunk into a bottom surface of the main body; and
   a guiding recess extended from the containing recess to an edge of one side of the main body.

10. The desktop holder of claim 9, further comprising a connecting terminal being assembled to one side wall of the containing recess and electrically connected to an external device.

11. The desktop holder of claim 1, wherein the pair of slots have slopes extended so as to be gradually far from each other in a direction from the top surface to a bottom surface of the main body, wherein the both ends of the soft member are supported by the slopes.

* * * * *